US010255495B2

(12) United States Patent
Atzmon et al.

(10) Patent No.: US 10,255,495 B2
(45) Date of Patent: Apr. 9, 2019

(54) SYSTEM AND METHOD FOR QUANTIFYING REFLECTION E.G. WHEN ANALYZING LAMINATED DOCUMENTS

(71) Applicant: AU10TIX LIMITED, Nicosia (CY)

(72) Inventors: Ron Atzmon, Tel Aviv (IL); Sergey Markin, Herzeliya (IL); Benjamin Neeman, Raanana (IL); Yael Moscovitz, Mevaseret Zion (IL)

(73) Assignee: AU10TIX LIMITED, Nicosia (CY)

( * ) Notice: Subject to any disclaimer, the term of this patent is extended or adjusted under 35 U.S.C. 154(b) by 13 days.

(21) Appl. No.: 15/322,817

(22) PCT Filed: Jul. 5, 2015

(86) PCT No.: PCT/IL2015/050693
§ 371 (c)(1),
(2) Date: Dec. 29, 2016

(87) PCT Pub. No.: WO2016/005968
PCT Pub. Date: Jan. 14, 2016

(65) Prior Publication Data
US 2017/0140217 A1 May 18, 2017

(30) Foreign Application Priority Data
Jul. 6, 2014 (IL) .......................... 233523

(51) Int. Cl.
*G06K 9/00* (2006.01)
*H04N 19/136* (2014.01)
(Continued)

(52) U.S. Cl.
CPC ....... *G06K 9/00442* (2013.01); *G06K 9/4642* (2013.01); *G06K 9/4652* (2013.01);
(Continued)

(58) Field of Classification Search
CPC ............. G06K 9/00442; G06K 9/4642; G06K 9/4652; G06K 9/4661; G06K 9/4671;
(Continued)

(56) References Cited

U.S. PATENT DOCUMENTS 5,142,617 A  8/1992 Dalrymple et al.
5,163,126 A  11/1992 Einkauf et al.
(Continued)

OTHER PUBLICATIONS

Cho et al; "Improved Specular Highlights with Adaptive Shading;" Computer Science Department, University of Southern California; 9pp; 1996.
(Continued)

*Primary Examiner* — Ali Bayat
(74) *Attorney, Agent, or Firm* — Oliff PLC

(57) ABSTRACT

A system for computerized authentication of a laminated object, the system comprising a digital medium storing a digital image of at least a portion of the laminated object in a computer-implemented memory; a shininess analyzer operative, using a processor, to generate shininess data quantifying shininess of the digital image; and a parameterized computerized authentication sub-system operative to differentially perform at least one laminated object authentication operation based on the shininess data.

15 Claims, 5 Drawing Sheets

(51) Int. Cl.
*H04N 19/186* (2014.01)
*G06K 9/46* (2006.01)
*G07D 7/202* (2016.01)

(52) U.S. Cl.
CPC .......... *G06K 9/4661* (2013.01); *G07D 7/205* (2013.01); *H04N 19/136* (2014.11); *H04N 19/186* (2014.11)

(58) Field of Classification Search
CPC ....... G06K 9/00234; G06T 7/90; G06T 7/711; G06T 7/507; G06T 15/50
See application file for complete search history.

(56) References Cited

U.S. PATENT DOCUMENTS

| | | |
|---|---|---|
| 5,253,339 A | 10/1993 | Wells et al. |
| 5,704,024 A | 12/1997 | Voorhies et al. |
| 5,739,820 A | 4/1998 | Lyon |
| 5,808,619 A | 9/1998 | Choi et al. |
| 7,008,760 B1 | 3/2006 | Yoneyama et al. |
| 7,401,732 B2 | 7/2008 | Haddad |
| 7,494,052 B1 | 2/2009 | Carpenter et al. |
| 8,274,665 B2 | 9/2012 | Silverbrook |
| 2003/0138128 A1 | 7/2003 | Rhoads |
| 2004/0081332 A1* | 4/2004 | Tuttle ................ G06K 9/00442 382/100 |
| 2008/0025555 A1 | 1/2008 | Visan et al. |
| 2009/0083329 A1* | 3/2009 | Shimada .......... G06F 17/30011 |
| 2009/0167672 A1* | 7/2009 | Kerofsky ............. G09G 3/3413 345/102 |
| 2011/0244919 A1* | 10/2011 | Aller .................. G06K 9/00973 455/556.1 |
| 2013/0082106 A1* | 4/2013 | Hoshina ................ H04N 1/107 235/455 |
| 2014/0002723 A1* | 1/2014 | Cook ........................ G06T 5/50 348/370 |

OTHER PUBLICATIONS

"Digimarc;" In Wikipedia; Retreived Dec. 17, 2015, from http://en.wikipedia.org/wiki/Digimarc.

"Phong Reflection Model;" In Wikipedia; Retreived Dec. 17, 2015, from https://en.wikipedia.org/w/index.php?title=Phong_reflection_model&oldid=602498842.

"Specify Lighting Algorithm;" In Math Works; Retrieved Dec. 17, 2015, from www.mathworks.com/help/matlab/ref/lighting.html.

* cited by examiner

SYSTEM AND METHOD FOR QUANTIFYING REFLECTION E.G. WHEN ANALYZING LAMINATED DOCUMENTS

FIELD OF THIS DISCLOSURE

The present invention relates generally to image processing and more particularly to computerized authentication of imaged objects.

BACKGROUND FOR THIS DISCLOSURE

A wide variety of systems for computerized authentication of documents are known.

According to Wikipedia, the Phong reflection model, developed in 1973, is an empirical model of the local illumination of points on a surface. Phong's methods have become "the de facto baseline shading method for many rendering applications."

Applications: According to Wikipedia, the Phong reflection model is used "to shade surfaces in 3D computer graphics software (and) to model the reflection of thermal radiation from the Pioneer probes".

The Phong reflection model provides an equation for computing the illumination of each surface point $I_p$:

$$I_p = k_a i_a = \sum_{m \in lights} (k_d(\hat{L}_m \cdot \hat{N}) i_{m,d} + k_s(\hat{R}_m \cdot \hat{V})^\alpha i_{m,s}).$$

Where:
 $k_s$, is a specular reflection constant, the ratio of reflection of the specular term of incoming light,
 $k_d$, is a diffuse reflection constant, the ratio of reflection of the diffuse term of incoming light (Lambertian reflectance),
 $k_a$, is an ambient reflection constant, the ratio of reflection of the ambient term present in all points in the scene rendered,
 $\alpha$, is a shininess constant for this material, which is larger for surfaces that are smoother and mirror-like. When this constant is large, the specular highlight is small.
 $\hat{L}_m$, is the direction vector from the point on the surface toward each light source (m specifies the light source),
 $\hat{N}$, is the normal at this point on the surface,
 $\hat{R}_m$, is the direction that a perfectly reflected ray of light would take from this point on the surface, and
 $\hat{V}$, is the direction pointing towards the view such as a virtual camera).
where direction vector $\hat{R}_m$ is computed as the reflection of $\hat{L}_m$ on the surface characterized by the normal $\hat{N}$ to the surface using:

$$\hat{R}_m = 2(\hat{L}_m \cdot \hat{N})\hat{N} - \hat{L}_m$$

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a method for deriving information, with low error rates, from laminated objects e.g. laminated documents such as ID documents from a known type of ID documents having known characteristics.

Certain embodiments of the present invention seek to provide a method for detecting reflection on surfaces e.g. 2D objects such as ID or other documents or images thereof. The Phong model is known to be valid for real 3D objects.

Typically, the number of basic colors is limited and the intensity of the color is due, at least partly, to a specular component. The basic colors (of the actual object) may, in the image, be seen to vary in that the same value or proportion is added to each of the basic R,G,B of the image due to shininess of the image generated by the lamination process.

Certain embodiments of the present invention seek to provide computerized generation of one or more of:

An RG Histogram: table of 256×256 values (if each pixel has 256 color values). Each entry is the number of pixels having a specific ordered pair of R, G (or any other subset of 2 or 3 or even 1 color component values).

Reflection LUT (look-up table), also termed herein "D": table generated from the RG histogram storing, for each ordered pair of red and green component values, the amount of reflection (e.g. distance from local maximum as described herein).

reflection image: generated from the original image and its Reflection LUT. To each pixel assign a reflection value which may be the reflection LUT value (=distance from the maximum) corresponding to that pixel's color {R, G, ignore B} in the original image.

Typically, reflection detection includes proceeding along a 45 degree diagonal in a color value histogram; it is appreciated that each color gets brighter by moving along the 45 degree diagonal, adding the same amount of intensity on all channels (e.g. all 3 of the R, G (and B) channels). From each histogram entry, typically, the method may move along the entry's 45 degree angle diagonal to values of lower R & G, until a local maximum is found. Another 256×256 table (if color depth=256) table may then be created to store distances from each pixel, along the 45 degree diagonal that includes that pixel, to the local maximum found for that diagonal. Entries on the diagonal which are darker than the maximum may be given the value 0.

The present invention typically includes at least the following embodiments:

Embodiment 1

A system for computerized authentication of a laminated object, the system comprising:

a digital medium storing a digital image of at least a portion of the laminated object in a computer-implemented memory;

a shininess analyzer operative, using a processor, to generate shininess data quantifying shininess of the digital image; and a parameterized computerized authentication sub-system operative to differentially perform at least one laminated object authentication operation based on the shininess data.

Embodiment 2

A system according to embodiment 1 wherein the image is represented by a multiplicity of pixels and the shininess analyzer is operative for quantifying shininess of the image by:

generating a 2-dimensional histogram array representing frequency of occurrence of each of a plurality of n-tuplets of color component values, in the image.

Embodiment 3

A system according to any of the preceding embodiments wherein the laminated object comprises a physical document.

Embodiment 4

A system according to any of the preceding embodiments wherein the physical document comprises an instance of a known type of physical ID documents and wherein the system also comprises a data-base storing computerized data characterizing a plurality of known types of physical ID documents.

Embodiment 5

A system according to any of the preceding embodiments wherein the data characterizing a plurality of known types of physical IL) documents comprises data indicating locations of pre-defined fields of interest within each of the plurality of known types of physical ID documents.

Embodiment 6

A system according to any of the preceding embodiments wherein each the n-tuplet comprises at least a pair of color values from among at least 3 color components representing each of the multiplicity of pixels.

Embodiment 7

A system according to any of the preceding embodiments wherein the shininess analyzer is also operative to identify, for each individual diagonal from among a plurality of diagonals covering the histogram array, a maximum array element corresponding to an n-tuplet of color component values which occurs more frequently than other color component values within the same individual diagonal.

Embodiment 8

A system according to any of the preceding embodiments wherein the shininess analyzer is also operative for determining a shininess value for each individual pixel, defining an individual n-tuplet of color component values, from among the multiplicity of pixels, by finding the individual n-tuplet of color component values in the 2-dimensional histogram array, thereby to identify a specific diagonal from among the plurality of diagonals to which the individual n-tuplet belongs, and computing a distance between the individual n-tuplet of color component values and the maximum array element defined for the specific diagonal.

Embodiment 9

A system according to any of the preceding embodiments wherein the shininess analyzer is also operative for outputting a function of the distance.

Embodiment 10

A system according to any of the preceding embodiments wherein the outputting a function of the distance comprises outputting a binary map including a binarization of the distance for each of the pixels, depending on whether the distance is above or below a predetermined threshold imposed on the distance.

Embodiment 11

A method for quantifying shininess of the image by:
generating a 2-dimensional histogram array representing frequency of occurrence of each of a plurality of n-tuplets of color component values, in the image;
for each individual diagonal from among a plurality of diagonals covering the histogram array, identifying a maximum array element corresponding to an n-tuplet of color component values which occurs more frequently than other color component values within the same individual diagonal;
determining a shininess value for each individual pixel, defining an individual n-tuplet of color component values, from among the multiplicity of pixels, by finding the individual n-tuplet of color component values in the 2-dimensional histogram array, thereby to identify a specific diagonal from among the plurality of diagonals to which the individual n-tuplet belongs, and computing a distance between the individual n-tuplet of color component values and the maximum array element defined for the specific diagonal; and
outputting a function of the distance.

Embodiment 12

A method according to any of the preceding embodiments wherein the identifying an n-tuplet which occurs more frequently is operative to disregard at least one frequently occurring color which exceeds a threshold selected to disqualify initially bright colors.

Embodiment 13

A method according to any of the preceding embodiments wherein the identifying an n-tuplet which occurs more frequently is operative to disregard at least one frequently occurring color lying along an individual diagonal whose distance from an initial color along the individual diagonal indicates that the frequently occurring color is such a dark color that the initial color could not be a shiny version of that dark color.

Embodiment 14

A system according to any of the preceding embodiments wherein the authentication operation comprises authenticating a flow of laminated objects based on information derived from fields of interest of known location within digital images representing the objects, according to at least one pre-defined parameter governing handling of each of the fields,
and wherein the sub-system is operative to differentially perform the authenticating by adjusting the pre-defined parameter for each individual instance within the flow to reflect a lower level of confidence in information derived from an individual field to the extent that the individual field is found by the shininess analyzer to be shiny, and a higher level of confidence in information derived from that individual field, to the extent that the individual field is found by the shininess analyzer not to be shiny.

Embodiment 15

A system according to any of the preceding embodiments wherein the authentication operation includes at least one forgery test and wherein the parameter is used by a processor to determine whether or not to perform the forgery test based on the individual field, as opposed to performing at least one forgery test based on at least one field other than the individual field.

Embodiment 16

A system according to any of the preceding embodiments wherein the sub-system is operative to differentially perform at least one authentication operation by determining, based on the shininess data, whether or not to fix the image, by computationally adjusting pixel values to remove estimated shininess effects, before executing a forgery test.

Embodiment 17

A system according to any of the preceding embodiments wherein the sub-system is operative to differentially perform at least one authentication operation by aggregating information about shininess of various instances of each of at least first and second document types, handling all instances of the first document type using a first forgery test whose parameters are selected given a first level of shininess that appears to characterize the first document type; and handling all instances of the second document type using a second forgery test whose parameters are selected given a second level of shininess that appears to characterize the second document type.

Embodiment 18

A system according to any of the preceding embodiments wherein the sub-system performs differentially at least one authentication operation by carrying out the authentication operation and reporting its result accompanied by a "level of confidence" indication stipulating that the results enjoy a low level of confidence, only if the shininess data indicates that shininess capable of adversely affecting the results has been detected.

Embodiment 19

A computer program product, comprising a non-transitory tangible computer readable medium having computer readable program code embodied therein, the computer readable program code adapted to be executed to implement a method for quantifying shininess of the image by:

generating a 2-dimensional histogram array representing frequency of occurrence of each of a plurality of n-tuplets of color component values, in the image;

for each individual diagonal from among a plurality of diagonals covering the histogram array, using at least one processor for identifying a maximum array element corresponding to an n-tuplet of color component values which occurs more frequently than other color component values within the same individual diagonal;

determining a shininess value for each individual pixel, defining an individual n-tuplet of color component values, from among the multiplicity of pixels, by finding the individual n-tuplet of color component values in the 2-dimensional histogram array, thereby to identify a specific diagonal from among the plurality of diagonals to which the individual n-tuplet belongs, and computing a distance between the individual n-tuplet of color component values and the maximum array element defined for the specific diagonal; and outputting a function of the distance.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to steps of flowcharts, may be performed by at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks. CDROMs, DVDs. BluRays, magnetic-optical discs or other discs; RAMS, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc. and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or Output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
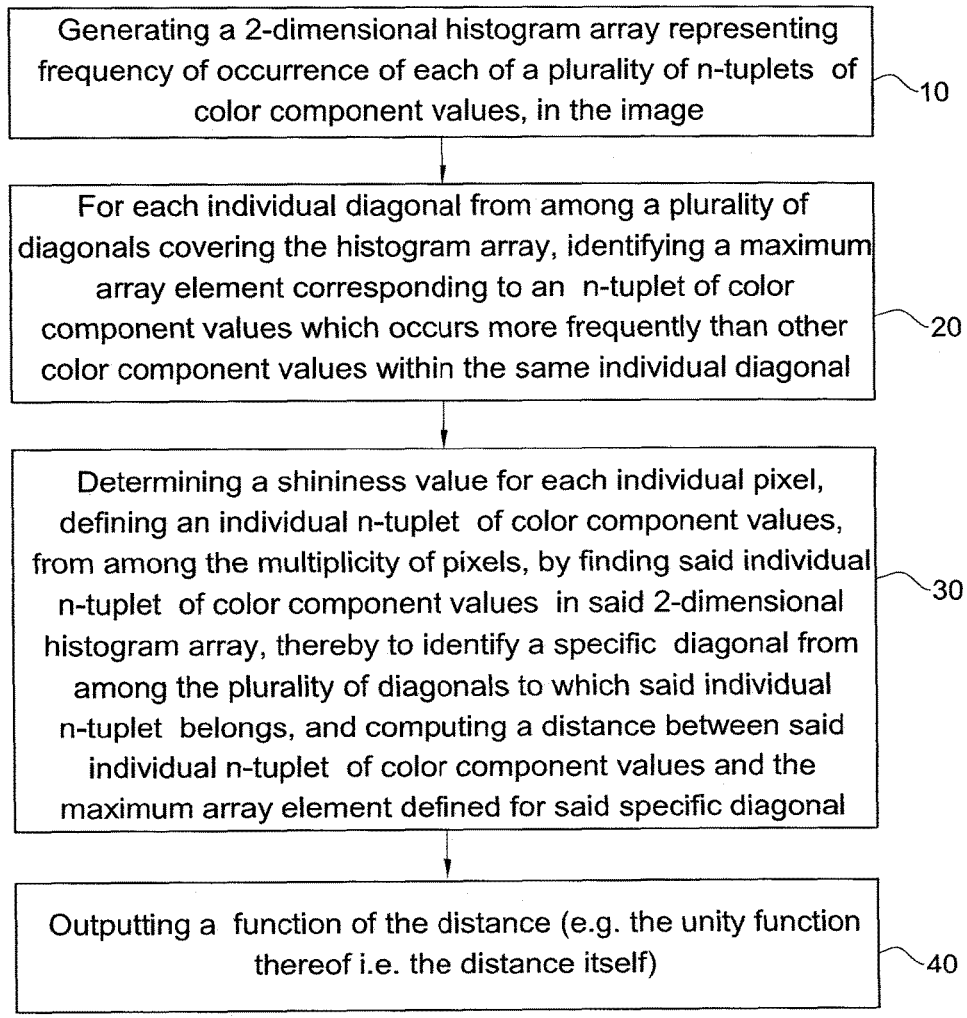
FIG. 1 is a simplified flowchart illustration of a computerized method for quantifying shininess of a digital image in accordance with certain embodiments of the present invention.

FIG. 1 is a simplified flowchart illustration of a computerized method for quantifying shininess of a digital image in accordance with certain embodiments of the present invention. The method of FIG. 1 may include some or all of the following steps, suitably ordered e.g. as shown:

Step 10: Generating a 2-dimensional histogram array representing frequency of occurrence of each of a plurality of n-tuplets of color component values, in the image.

Step 20: for each individual diagonal from among a plurality of diagonals covering the histogram array, identifying a maximum array element corresponding to an n-tuplet of color component values which occurs more frequently than other color component values within the same individual diagonal Step 30: determining a shininess value for each individual pixel, defining an individual n-tuplet of color component values, from among the multiplicity of pixels, by finding said individual n-tuplet of color component values in said 2-dimensional histogram array, thereby to identify a specific diagonal from among the plurality of diagonals to which said individual n-tuplet belongs, and computing a distance between said individual n-tuplet of color component values and the maximum array element defined for said specific diagonal Step 40: Outputting a function of the distance (e.g. the unity function thereof i.e. the distance itself).

Figure 2:
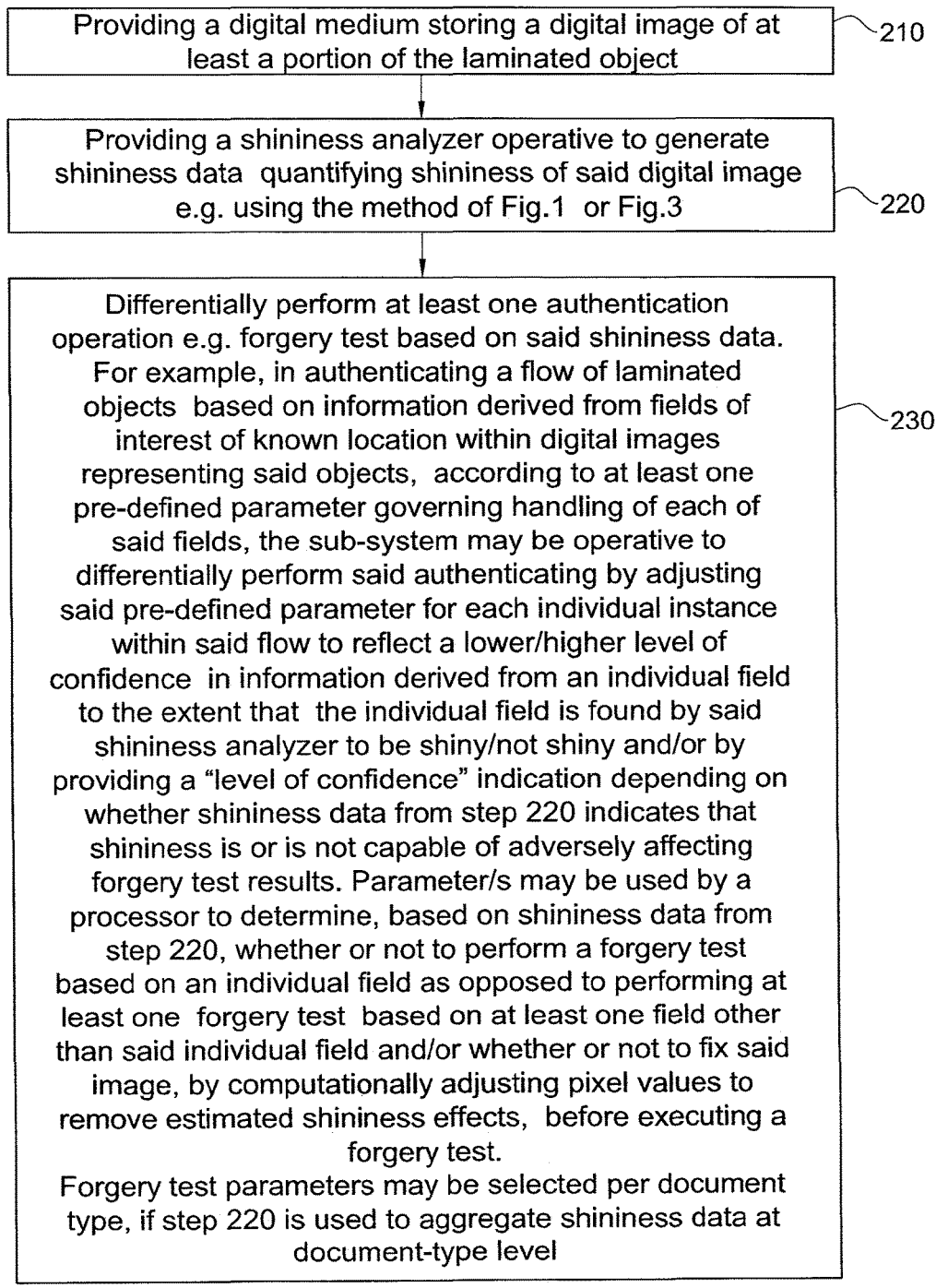
FIG. 2 is a simplified flowchart illustration of a computerized method for authentication of a laminated object, in accordance with certain embodiments of the present invention.

FIG. 2 is a simplified flowchart illustration of a computerized method for authentication of a laminated object, in accordance with certain embodiments of the present invention. The method of FIG. 2 may include some or all of the following steps, suitably ordered e.g. as shown:

Step 210: Providing a digital medium storing a digital image of at least a portion of the laminated object Step 220: Providing a shininess analyzer operative to generate shininess data quantifying shininess of said digital image e.g. using the method of FIG. 1 or FIG. 3

Step 230: differentially perform at least one authentication operation based on said shininess data.

Figure 3:
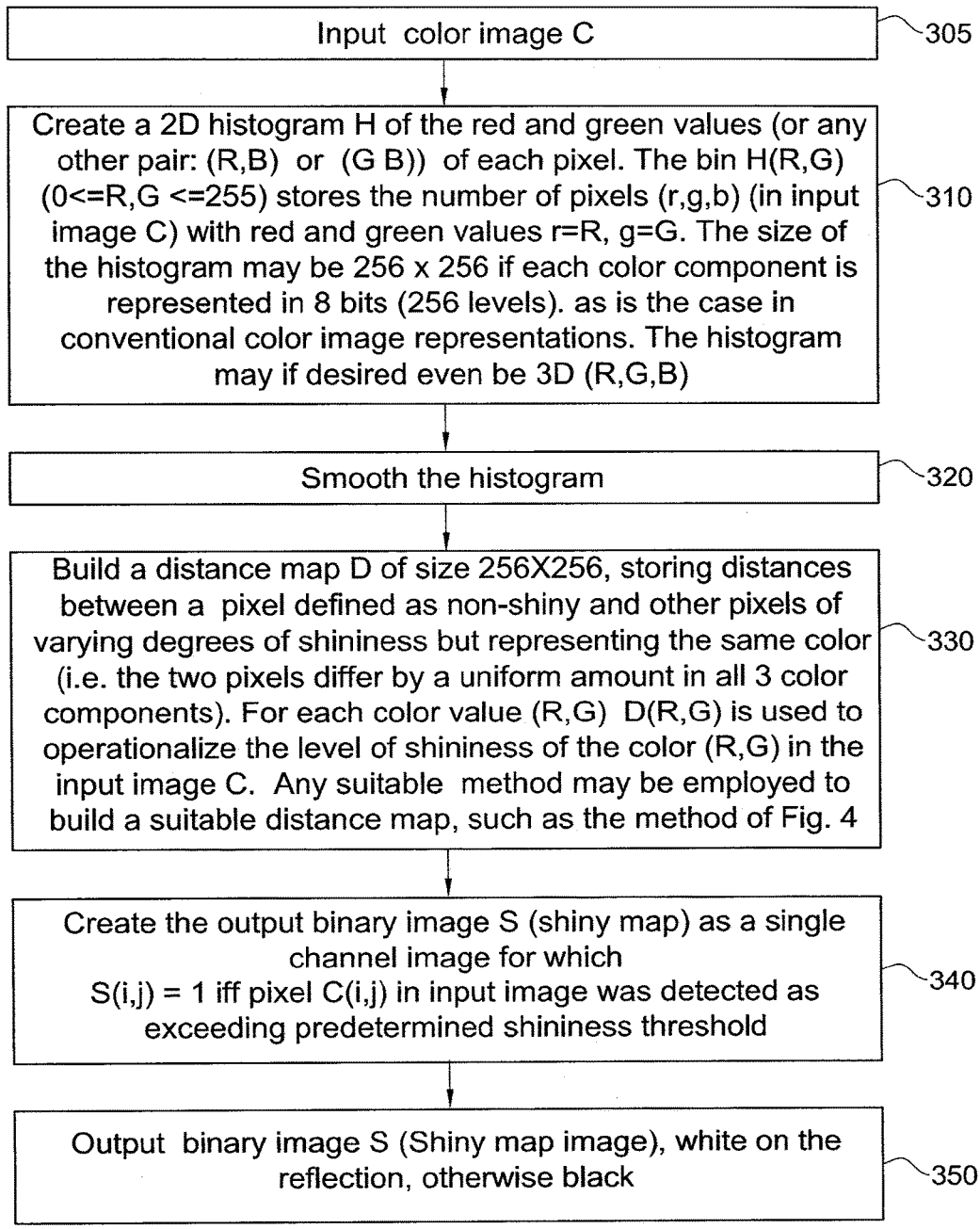
FIG. 3 is a simplified flowchart illustration of a computerized reflection detection method.
Figure 4:
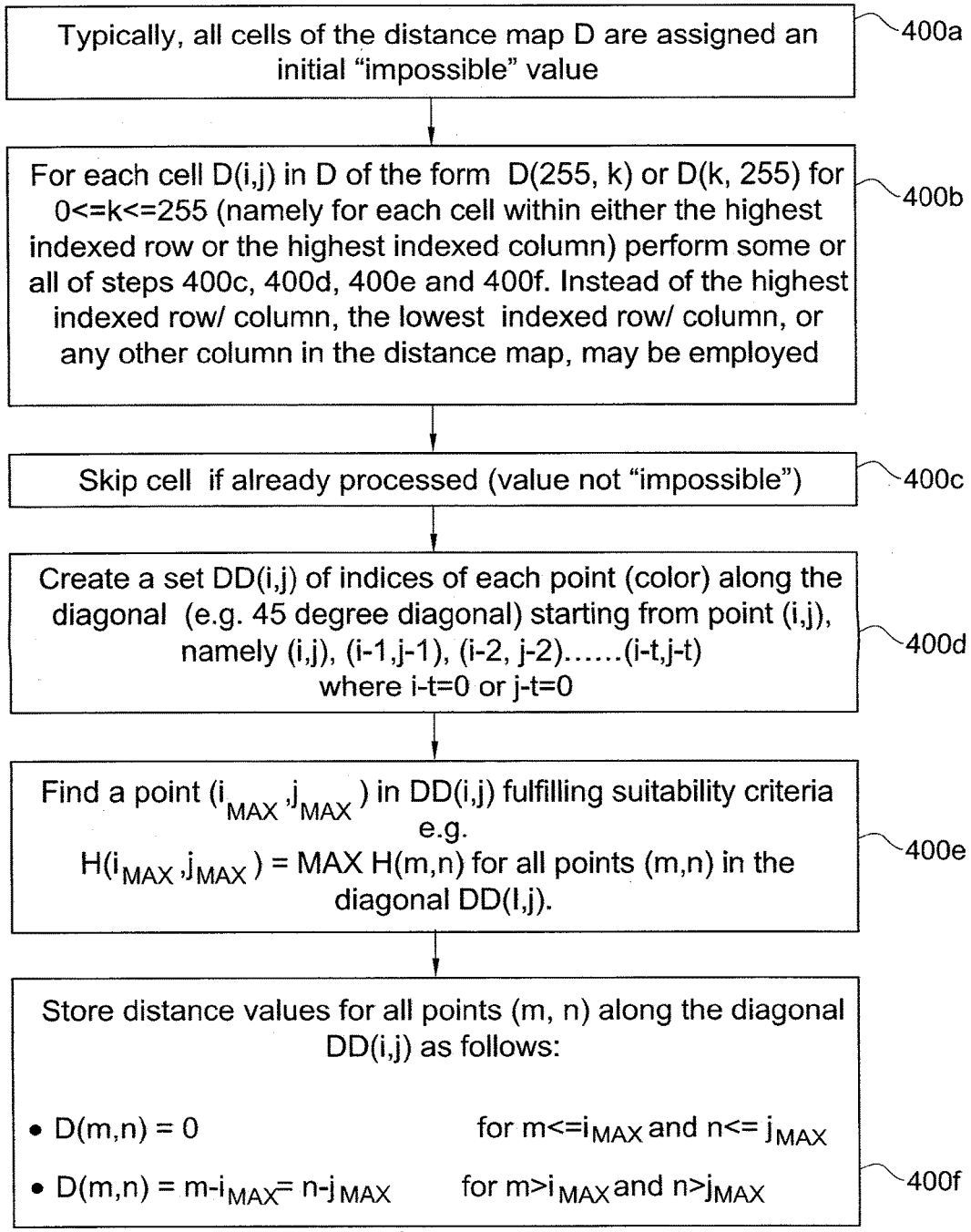
FIG. 4 is a simplified flowchart illustration of a computerized method for building a distance map, and may for example be employed in order to implement step 330 of FIG. 3.

Referring now to FIGS. 3 and 4, an example of a suitable reflection detection method is now described, for identifying shiny pixels represented by higher values of initial (r,g,b) cells (pixels). Any or all of the steps of the method of FIG. 3 may for example be used to provide a more detailed implementation of the general method of FIG. 1.

Shiny pixels are typically characterized by a linear increase of all 3 (r,g,b) values e.g. each component increases by the same x %), relative, say, to the same image when un-laminated.

The method of FIG. 3 typically includes some or all of the following steps, suitably ordered e.g. as shown:

Step 305: Input color image C.

Step 310: Create a 2D histogram H of the red and green values (or any other pair: (R,B) or (G B)) of each pixel. The bin H(R,G) (0<=R,G<=255) stores the number of pixels (r,g,b) (in input image C) with red and green values r=R, g=G. The size of the histogram may be 256×256 if each color component is represented in 8 bits (256 levels), as is the case in conventional color image representations. The histogram may if desired even be 3D (R,G,B).

Step 320: Smooth the histogram with a suitably sized (e.g. 9×9, 7×7 or 11×11) moving window. Alternatively, instead of a moving window, any suitable smoothing algorithm or suitable filter/s may be employed, e.g.: Gaussian, rectangle blur, median, bilateral.

Step 330: build a distance map D of size 256×256, storing distances between a pixel defined as non-shiny and other pixels of varying degrees of shininess but representing the same color (e.g. the two pixels differ by a uniform amount in all 3 color components). For each color value (R,G) D(R,G) is used to operationalize the level of shininess of the color (R,G) in the input image C. Any suitable method may be employed to build a suitable distance map, such as the method of FIG. 4.

Step 340: Create the output binary image S (shiny map) as the following single channel image:

$$S_{ij} = \begin{cases} 1, & C_{ij} = (r \cdot g \cdot b) \,\&\&\, D(r, g) > 40 \\ 0, & \text{otherwise} \end{cases}$$

Where && signifies a (logical AND or) a conditional-ANT) operator which performs a logical-ANT) of its Boolean operands, but only evaluates the second operand if necessary if operand1 is false, operand2 may not be evaluated.

Typically, $S(i,j)=1$ iff the pixel $C(i,j)$ in the input image was detected as exceeding a predetermined shininess threshold e.g. 40, or, alternatively, any other suitable value e.g. in the range between 30 and 60, assuming 256 color levels.

Step 350: Output binary image S (Shiny map image), white on the reflection, otherwise black.

Reference is now made to FIG. 4 which is a simplified method operative to build a distance map D (e.g. of size 256×256, if color component values are stored at a resolution of 256 levels) storing distances between a pixel defined as non-shiny and other pixels of varying degrees of shininess but representing the same color (i.e. the two pixels differ by a uniform amount in all 3 color components). For each color value (R,G) D(R,G) may be defined as the level of shininess of the color (R,G) in the input image C.

The method of FIG. 4 typically includes some or all of the following steps, suitably ordered e.g. as shown:

400a, typically, all cells of the distance map D are assigned an initial "impossible" value e.g. −1.

400b. For each cell $D(i,j)$ in D of the form $D(255, k)$ or $D(k, 255)$ for $0<=k<=255$ (namely for each cell within either the highest indexed row or the highest indexed column) perform some or all of steps 400c, 400d, 400e and 400f. Instead of the highest indexed row/column, the lowest indexed row/column, or any other column in the distance map, may be employed. It is appreciated that typically, all diagonals are traversed.

400c: If $D(i, j)>−1$, skip this cell (cell already processed)

400d: Create a set $DD(i,j)$ of indices of each point (color) along the diagonal (e.g. 45 degree diagonal) starting from point (i,j), namely (i,j), (i−1,j−1), (i−2, j−2) ... (i−t,j−t) where i−t=0 or j−t=0.

Typically, a reflection effect equally increases each of the color components (r,g,b), so points along a 45 degree diagonal may be expected to be the geometric location of:

an original, non-shiny color; and all "shiny" colors created due to light reflected from the original, non-shiny color.

400e. Find a point $(i_{MAX}, j_{MAX})$ in $DD(i,j)$ fulfilling some or, more typically, all of the following criteria:

Criterion i: Histogram value $H(i_{MAX}, j_{MAX})=MAX H(m,n)$ for all points (m,n) in the diagonal $DD(i,j)$. It is appreciated that in many applications it is possible to assume that when many pixels in an image have a particular color $(i_{MAX}, j_{MAX})$, these pixels, rather than other pixels along the same diagonal, represent the non-shiny variation of the color.

Criterion ii: Both Imax and Jmax are lower than a predetermined criterion II threshold T2 e.g. 230.

This criterion ensures that colors that are not too bright are selected so that the eventual map includes only those pixels whose color component values are high due to shininess rather than due to an initial very bright color.

Criterion iii: ($i_{MAX}, j_{MAX}$) is at distance of at most T3=80 pixels (say, or any other suitable application-specific parameter) from the diagonal origin. In other words: $i_{MAX} > i-80$ and $j_{MAX} > j-80$. T3 is also termed herein the "criterion III threshold".

This criterion ensures that the color represented by the proposed "maximum" point along the diagonal is not too far from the initial color (i,j). Excessive distance from the initial color along the diagonal indicates a color which is so dark that it is not reasonable that the initial (i,j) color is a shiny version of that dark color, because the shininess effect is expected to affect bright colors more than dark colors since optically the bright colors are more reflective than dark.

400f. Once a point ($i_{MAX}, j_{MAX}$) is found as above, store distance values for all points (m, n), where m, n are indices not histogram values, along the diagonal DD(i,j) as follows:

$D(m,n) = 0$ for $m <= i_{MAX}$ and $n <= j_{MAX}$.

$D(m,n) = m - i_{MAX} = n - j_{MAX}$ for $m > i_{MAX}$ and $n > j_{MAX}$

It is appreciated that since the (m,n) ordered pairs all lie along the diagonal, the two indices increment simultaneously as the method proceeds along the diagonal.

Figure 5:
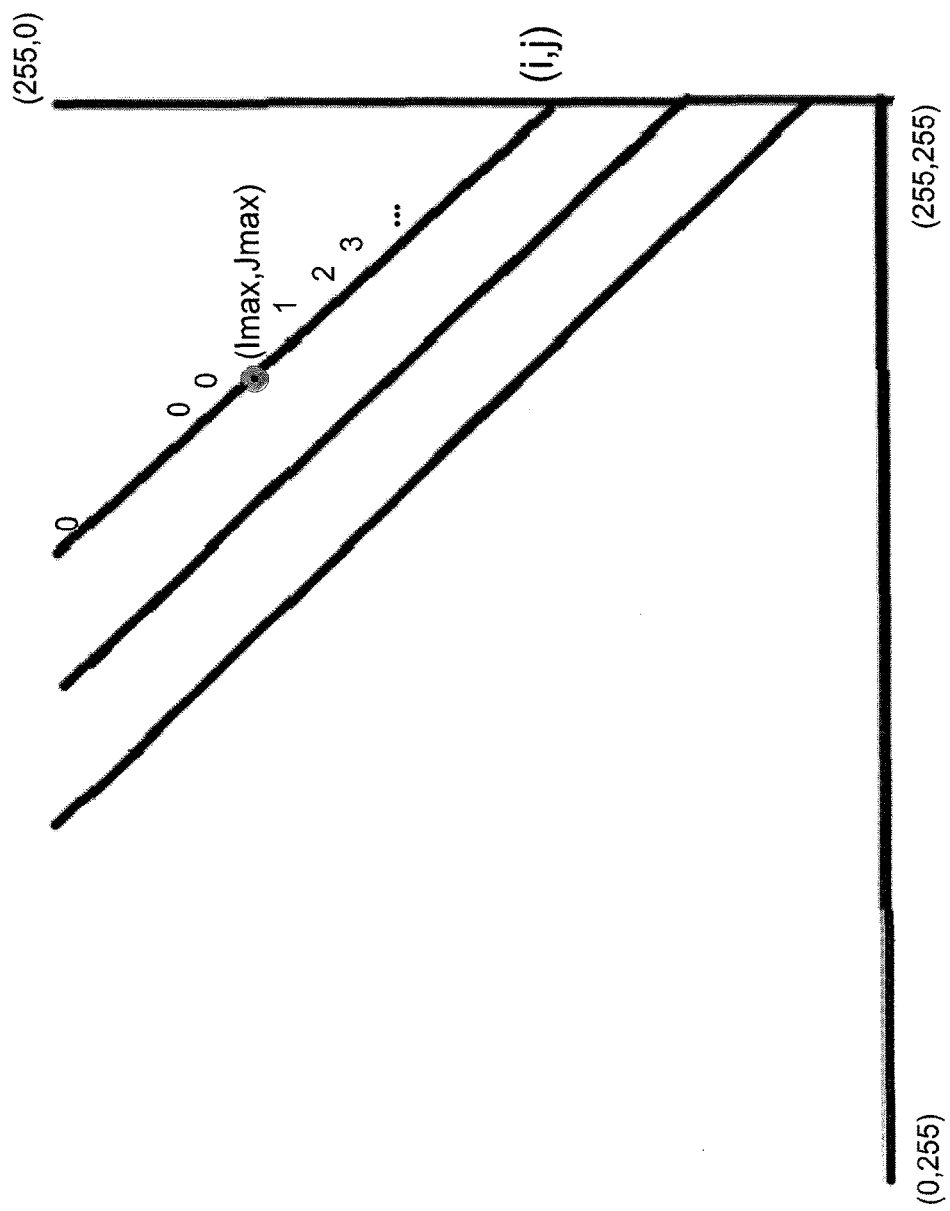
FIG. 5 is a graphic illustration of aspects of building a distance map D, proceeding along each of several 45 degree diagonals together covering the entire map, in accordance with the method of FIG. 4.

FIG. 5 is a graphic illustration of aspects of building a distance map D, proceeding along each of several 45 degree diagonals together covering the entire map, in accordance with the method of FIG. 4.

It is appreciated that the constants used in the methods of FIGS. 3, 4, such as the values of: 230 (for the criterion II threshold), 80 (for the criterion III threshold), 40 (for the shininess threshold) are merely exemplary. Alternatively, any suitable application-specific considerations and/or set-up procedure may be employed to determine alternative values.

For example, a set of representative images may be analyzed in a set-up stage—such as a set of laminated identity documents of the type a particular identity document authentication system is expected to authenticate.

In each member of the set, a "reflected area" is identified, namely a region within the laminated image of each document which is determined, e.g. by visual inspection, to be compromised by reflected light. The reflected area is a region whose pixels' color levels are lighter than pixels surrounding the reflected area and are not continuous compared to the surrounding pixel. For example, a person's face or clothing may be distinguishable e.g. by visual inspection. If first portions of the face or clothing are included in a reflected area and other, second, portions are not, then the skin color or clothing color will be observed to be brighter in the first portions relative to the second portions.

To find a suitable criterion II threshold, identify a value, e.g. the smallest possible value, which exceeds all or almost all pixel color component values r, g, b in the reflected area.

To find a suitable criterion III threshold, shiny values may be analyzed for at least one image or typically a representative set of images of laminated objects. Shiny values are values that describe extents or levels of shininess for a given color component combination (R, G) (or any other combination of color components). Typically the "shiny value" of an individual color component combination (R, G) occurring along an individual diagonal is the Euclidean distance between that color component combination (R, G) and the (R, G) values of the maximum found along the individual diagonal. To set a criterion III threshold, identify a value which exceeds (e.g. the smallest value which exceeds) some or all of the shiny values of an image or representative set of images.

To determine a suitable shininess threshold, binary shiny maps may be generated during a set-up phase, e.g. using the method of FIG. 3, typically both for relatively shiny images and for relatively non-shiny images. The "1" values in the maps define a region within the image which is a "reflected area" i.e. is believed to be compromised by reflected light. This process is repeated several times using several possible shininess threshold values, respectively, for step 340. For example, for a given image, 4 different reflected areas may be identified, using shininess thresholds of 30, 40, 50 and 60 respectively, the detected shiny areas ("reflected areas") are compared to manually (by visual perception) determined shiny areas for the same image and a "best" threshold for that image is selected, as the threshold resulting in a shiny area which is found (by inspection or computationally) to most closely resemble the manually determined shiny area for the same image, in size and/or shape. Eventually, a shininess threshold value is selected which is "best" for the largest number of images, or different shininess threshold values may be selected for different categories of images e.g. images having different general levels of shininess, perhaps due to use of different illumination, imaging conditions, and/or lamination equipment.

It is appreciated that any other suitable method, other than those described herein in the methods of FIGS. 1-4, may be employed to generate a "shiny map", and the shiny map may or may not be binary. For example, particularly for images of non-white surfaces such as ID documents which lack white areas, a "shiny map" may be generated by simply binarizing the image such that all white areas (pixels which pass a whiteness threshold, or all white areas which are not expected to be white given accumulated data about the document type being imaged) are white, and all other areas are black.

Alternatively or in addition, contours of shiny areas may be identified by finding "edges" along which colors suddenly become much whiter e.g. several r, g, b pixels are found right next to pixels whose values are (100+p)/100×r, (100+p)/100×b, (100+p)/100×g for some p. A sudden linear drop in all 3 color component values, along a curve or line, may be considered an edge of a "shiny" region.

Alternatively or in addition, laminated images of a known 2d object e.g. known ID document may be compared to the 2d object itself to identify shininess which appears only in the image and not (at least under certain lighting conditions) in the 2d object itself.

Alternatively or in addition, image pixels may be divided into sets where each set has the same basic color component values, plus or minus a fixed added number of levels to all 3 components. So for example, (3, 8, 9); (103, 108, 109); and (223, 228, 229) would be in the same set. For each such set, the pixel with the lowest color component values in the set ((3, 8, 9) in the above example) is assumed to be a non-shiny pixel whose shininess is zero and a suitable distance metric e.g. Euclidean is used to compute the distance of each other pixel in the set from the non-shiny pixel. The shininess map includes, for each pixel; the distance thus computed or a binarized value thereof, using any suitable threshold for binarizing the distances depending on the application.

It is appreciated that a shininess map, which may or may not be binarized, may have a wide variety of uses, for example in accordance with the method of FIG. 2, e.g. in determining how to authenticate an imaged person or object, based inter alia on an image of the person or object for which shininess data e.g. a shininess map is available. Uses may include but are not limited to some or all of:

1. For each individual instance of a known document type, generate a (typically binarized) shininess map and compare to a map designating locations of known regions or "fields" of interest (e.g. name, address, date of birth etc.) retained for the known document type and indeed for each of a plurality of known document types such as American passport, French driving license, Israeli ID card, etc. Then, adjust pre-defined parameters governing handling of each region for each individual instance to reflect a lower level of confidence in information derived from that region to the extent that the region is shiny, and a higher level of confidence in information derived from that region to the extent that the region is not shiny. For example, if the date of birth region was found to be shiny in an individual instance of a known document type, adjust pre-defined parameters governing all decision processes for that individual instance which are based on date of birth, to reflect a lower level of confidence in that field. Any suitable parameters governing handling of each region based on shininess information may be defined. For example, a parameter may determine whether or not to perform forgery test/s (such as but not limited to checksum or data comparison) based on an individual region (perhaps as opposed to performing forgery test's based on other regions) since wrong values are likely to be due to the shininess of the region rather than due to the fact that the document is forged.
2. determining whether or not to fix the image, by using a predetermined process for replacing shiny hence non-informative pixels by a color value closer to the pixel's "real" e.g. "non-laminated" value, by computationally adjusting pixel values to remove estimated shininess effects e.g. due to lamination. For example, brightness could be reduced in pixels found to be "shiny" by subtracting the same number of levels from all 3 color component values (e.g. subtracting 100 from R, from G and from B). After such a fix, continue processing (e.g. authenticating) the image in the usual manner.
3. aggregating information about shininess of various instances of a given document type, and adjust handling of all instances of the given document type based on the general shininess that appears to characterize this type of document e.g. due to the type of lamination performed when this document is produced.
4. outputs characterizing an image may be accompanied by a system-generated "level of confidence" indication stipulating whether the outputs enjoy a high or low level of confidence, depending on whether shininess capable of adversely affecting these outputs has or has not been detected (and, optionally, has or has not been fixed if detected).
5. shininess can be a result of less than ideal camera conditions. Shininess data (e.g. a "shiny map") may be accumulated and stored in computer storage, in association with an indication of the document type to which the document instance belongs, and/or with an indication of the camera or imaging device which imaged the shiny regions in a collection of shininess maps that were produced by the same device. If there is an observable correlation (for example, shiny regions always appear in similar locations), this may serve as a request to modify parameters in the camera conditions e.g. to reduce exposure of the shiny area, using the HDR (High-dynamic-range) technique: e.g. produce several pictures with different exposure levels and compose a picture where the shiny pixels are replaced by those with lower exposure, and/or the shutter size may be controlled and/or the Gain Control may be manipulated to decrease gain control for shiny pixels relative to non-shiny pixels.

It is appreciated that the above uses may be combined in any suitable manner, depending on the application. For example, shiny regions in an image may be fixed if suitable tests or accumulated past results for similar images indicate that this is feasible. Then, image processing operations, such as but not limited to segmentation or edge detection, may be performed. If shininess is detected but is deemed not fixable, suitable pre-defined control parameters can avoid such operations, generally or in affected regions. Alternatively or in addition, the operations may be performed, but suitable pre-defined control parameters can generate suitable warnings to users, about non-reliability of the operations. For example, outputs based on image processing operations adversely affected by shininess may be accompanied by a "level of confidence" indication stipulating whether the outputs enjoy a high or low level of confidence, based on shininess data.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMS. Components described herein as software may, alternatively, be implemented wholly or partly in hardware and/or firmware, if desired, using conventional techniques, and vice-versa. Each module or component may be centralized in a single location or distributed over several locations.

Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including at least one processor and/or cooperating input device and/or output device and operative to perform e.g. in software any steps shown and described herein; information storage devices or physical records, such as disks or hard drives, causing at least one computer or other device to be configured so as to carry out any or all of the steps of any of the methods shown and described herein, in any suitable order; at least one program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; at least one processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including method steps, which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including method steps, which are described for brevity in the context of a single embodiment or in a certain order may be provided separately or in any suitable subcombination, including with features known in the art (particularly, although not limited, to those described in the Background section or in publications mentioned therein) or in a different order. "e.g." is used herein in the sense of a specific example which is not intended to be limiting. Each method may comprise some or all of the steps illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for computerized authentication of a laminated object, the system comprising:
    a digital image of at least a portion of the laminated object stored in a computer-implemented memory;
    a shininess analyzer operative, using a processor, to generate shininess data quantifying shininess of said digital image; and
    a parameterized computerized authentication sub-system operative, using the processor, to differentially perform at least one laminated object authentication operation based on said shininess data,
    wherein said image is represented by a multiplicity of pixels and said shininess analyzer is operative for quantifying shininess of the image by:
        generating a 2-dimensional histogram array representing frequency of occurrence of each of a plurality of n-tuplets of color component values, in the image,
    wherein said shininess analyzer is also operative to identify, for each individual diagonal from among a plurality of diagonals covering the histogram array, a maximum array element corresponding to an n-tuplet of color component values which occurs more frequently than other color component values within the same individual diagonal.

2. A system according to claim 1 wherein said laminated object comprises a physical document.

3. A system according to claim 2 wherein said physical document comprises an instance of a known type of physical ID documents and wherein the system also comprises a data-base storing computerized data characterizing a plurality of known types of physical ID documents.

4. A system according to claim 3 wherein said data characterizing a plurality of known types of physical ID documents comprises data indicating locations of pre-defined fields of interest within each of said plurality of known types of physical ID documents.

5. A system according to claim 1 wherein each said n-tuplet comprises at least a pair of color values from among at least 3 color components representing each of said multiplicity of pixels.

6. A system according to claim 1 wherein said shininess analyzer is also operative for determining a shininess value for each individual pixel, defining an individual n-tuplet of color component values, from among the multiplicity of pixels, by finding said individual n-tuplet of color component values in said 2-dimensional histogram array, thereby to identify a specific diagonal from among the plurality of diagonals to which said individual n-tuplet belongs, and computing a distance between said individual n-tuplet of color component values and the maximum array element defined for said specific diagonal.

7. A system according to claim 6 wherein said shininess analyzer is also operative for outputting a function of said distance.

8. A system according to claim 7 wherein said outputting a function of said distance comprises outputting a binary map including a binarization of said distance for each of said pixels, depending on whether said distance is above or below a predetermined threshold imposed on said distance.

9. A method for quantifying shininess of the image by:
generating a 2-dimensional histogram array representing frequency of occurrence of each of a plurality of n-tuplets of color component values, in the image;
for each individual diagonal from among a plurality of diagonals covering the histogram array, identifying a maximum array element corresponding to an n-tuplet of color component values which occurs more frequently than other color component values within the same individual diagonal;
determining a shininess value for each individual pixel, defining an individual n-tuplet of color component values, from among the multiplicity of pixels, by finding said individual n-tuplet of color component values in said 2-dimensional histogram array, thereby to identify a specific diagonal from among the plurality of diagonals to which said individual n-tuplet belongs, and computing a distance between said individual n-tuplet of color component values and the maximum array element defined for said specific diagonal; and
outputting a function of said distance,
wherein said identifying an n-tuplet which occurs more frequently is operative to disregard at least one frequently occurring color which exceeds a threshold selected to disqualify initially bright colors.

10. A system according to claim 1
wherein said authentication operation comprises authenticating a flow of laminated objects based on information derived from fields of interest of known location within digital images representing said objects, according to at least one pre-defined parameter governing handling of each of said fields, and
wherein said sub-system is operative to differentially perform said authenticating by adjusting said pre-defined parameter for each individual instance within said flow to reflect a lower level of confidence in information derived from an individual field to the extent that the individual field is found by said shininess analyzer to be shiny, and a higher level of confidence in information derived from that individual field, to the extent that the individual field is found by said shininess analyzer not to be shiny.

11. A system according to claim 10 wherein said authentication operation includes at least one forgery test and wherein said parameter is used by a processor to determine whether or not to perform said forgery test based on said individual field, as opposed to performing at least one forgery test based on at least one field other than said individual field.

12. A system according to claim 1 wherein said sub-system is operative to differentially perform at least one authentication operation by determining, based on said shininess data, whether or not to fix said image, by computationally adjusting pixel values to remove estimated shininess effects, before executing a forgery test.

13. A system according to claim 1 wherein said sub-system is operative to differentially perform at least one authentication operation by aggregating information about shininess of various instances of each of at least first and second document types, handling all instances of the first document type using a first forgery test whose parameters are selected given a first level of shininess that appears to characterize said first document type; and handling all instances of the second document type using a second forgery test whose parameters are selected given a second level of shininess that appears to characterize said second document type.

14. A system according to claim 1 wherein said sub-system performs differentially at least one authentication operation by carrying out the authentication operation and reporting its result accompanied by a "level of confidence" indication stipulating that said results enjoy a low level of confidence, only if said shininess data indicates that shininess capable of adversely affecting said results has been detected.

15. A non-transitory computer readable medium having computer readable program code stored therein, said computer readable program code adapted to be executed to implement a method for quantifying shininess of the image by:
generating a 2-dimensional histogram array representing frequency of occurrence of each of a plurality of n-tuplets of color component values, in the image;
for each individual diagonal from among a plurality of diagonals covering the histogram array, using at least one processor for identifying a maximum array element corresponding to an n-tuplet of color component values which occurs more frequently than other color component values within the same individual diagonal;
determining a shininess value for each individual pixel, defining an individual n-tuplet of color component values, from among the multiplicity of pixels, by finding said individual n-tuplet of color component values in said 2-dimensional histogram array, thereby to identify a specific diagonal from among the plurality of diagonals to which said individual n-tuplet belongs, and computing a distance between said individual n-tuplet of color component values and the maximum array element defined for said specific diagonal; and
outputting a function of said distance,
wherein said identifying an n-tuplet which occurs more frequently is operative to disregard at least one frequently occurring color lying along an individual diagonal whose distance from an initial color along the individual diagonal indicates that said frequently occurring color is such a dark color that the initial color could not be a shiny version of that dark color.

\* \* \* \* \*